UNITED STATES PATENT OFFICE.

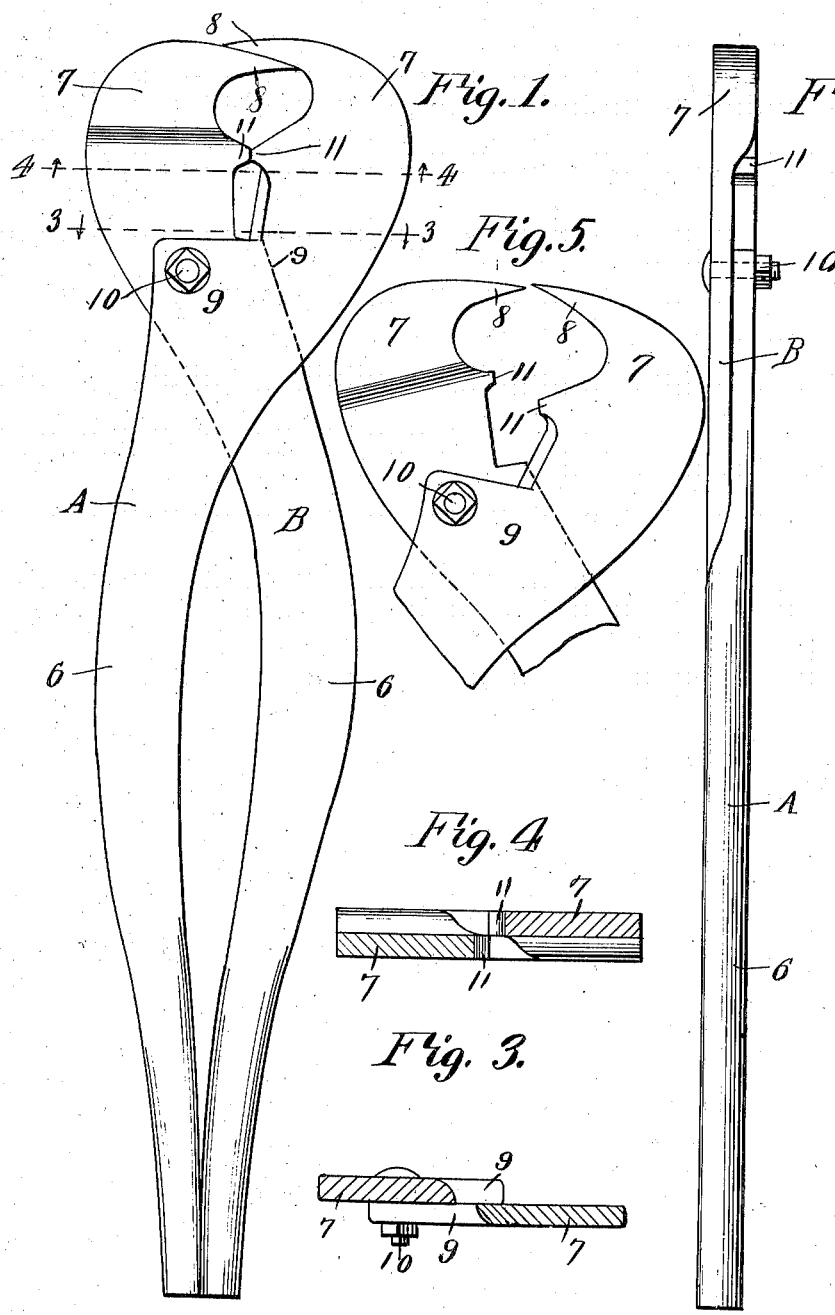

JOHN N. MACDONALD, OF HARTFORD, CONNECTICUT

CHAIN-REPAIRING IMPLEMENT.

965,722.

Specification of Letters Patent.  Patented July 26, 1910.

Application filed July 14, 1909. Serial No. 507,659. REISSUED

*To all whom it may concern:*

Be it known that I, JOHN N. MACDONALD, a citizen of the United States, residing at Hartford, in the county of Hartford and State of Connecticut, have invented new and useful Improvements in Chain-Repairing Implements, of which the following is a specification.

This invention relates to an improved implement for repairing chains, such as the tire chains of automobiles and the like, and it has for its object to provide a simple and improved device of this character, which may be conveniently carried in a tool chest or in an ordinary repair kit and by the use of which links may be expanded and again closed as may be required.

Another object of the invention is to provide a simple and improved implement in the shape of a pair of tongs or pliers and having jaws that are shaped to form coacting wedges which may be inserted in the joint of a chain link for the purpose of expanding the latter when the jaws are closed together.

A still further object of the invention is to construct the jaws of the tongs or pliers with shoulders or off-sets upon which a chain link may be supported while being compressed to close the joint.

A still further object of the invention is to so construct the shoulders or off-sets that they may be utilized for the purpose of compressing the ends of a chain link between them.

With these and other ends in view, which will readily appear as the nature of the invention is better understood, the same consists in an improved construction and a novel arrangement and combination of parts which will be hereinafter fully described and particularly pointed out in the claim.

In the accompanying drawing has been illustrated a simple and preferred form of the invention; it being however understood that no limitation is necessarily made to the precise structural details therein exhibited but that changes, alterations and modifications within the scope of the invention may be resorted to when desired.

In the drawing: Figure 1 is a front view of an implement constructed in accordance with the invention. Fig. 2 is a side view of the same. Fig. 3 is a transverse sectional view taken on the plane indicated by the line 3—3 in Fig. 1. Fig. 4 is a transverse sectional view taken on the plane indicated by the line 4—4 in Fig. 1. Fig. 5 is a detailed front view showing the jaws of the implements in open position.

Corresponding parts in the several figures are denoted by like characters of reference.

The improved implement is composed of two members, A and B each comprising a handle portion 6 and a jaw portion 7. The jaws 7 are formed of considerable width as compared with the handles, and said jaws are shaped to form curved or arcuate hooks, the bills of which, 8, extend toward each other; the bill of one hook being overlapped by the bill of its mate. The members A and B are provided adjacent to the hook shaped jaws and intermediate said jaws and the handle portions, with laterally extending off-sets or shoulders 9, for the passage of the connecting pin or pivot 10 which is eccentrically disposed, near the outer edge of one of the shoulders 9 and at a point remote from the outer edge of the shoulder or off-set 9 of the proximate member so that the outer face of one of the jaw-bills, and the inner face of the bill of the other jaw will be concentric with the axis of the pivot 10; said faces being also devised to lie in contact with each other when the jaws are closed together. The bills 8 of the hook shaped jaws 7 are wedge shaped as shown and owing to the eccentric disposition of the pivot connecting the members A and B the said wedge shaped bills will move in contact with each other, while the jaws are being moved to an open position, causing the sharp edges of the wedges to be adjacently placed when the jaws are opened, as will appear by reference to Fig. 5 of the drawings.

The jaws are formed with lateral projections or off-sets 11 on their opposite faces, said off-sets combining with the bill portions of the jaws to form a recess of the shape and dimensions of an oblong chain link, of one of the kind that the tool is designed to operate upon; the outer portions of the jaws are relatively of great width and by properly shaping the jaws they will when closed together exert an expanding wedge action upon material, such as a chain link engaged thereby.

When a machine is to be disjointed for the purpose of inserting a new link or for any other reason, one of the links may be opened by swinging the jaws of the tool to an open position, after which the terminal edges of the jaws are placed in engagement with the joint of the link upon opposite sides of the latter; by closing the jaws together the wedge shaped bills of the jaws will spread the link open as will be readily understood. When the link is to be closed, said link, if of the conventional oblong shape, may be placed between the jaws while the latter are open in such a manner as to be supported upon the off-sets 11 and between the latter and the bills of the hooks constituting the jaws; by closing the latter the link will be compressed as will be readily understood. Other forms of links may be closed by pressure between the portions of the jaws adjacent to the inner faces of the shoulders or off-sets 11, which latter will constitute stops to prevent slipping.

Having thus described the invention what is claimed is:—

A tool of the character described comprising two members having terminal jaws provided with relatively wide unobstructed wedge-shaped bills overlapping one another and said members being connected by an eccentrically disposed pivot; the outer face of one jaw bill and the inner face of the bill of the other jaw being adapted to move by and lie in contact with each other throughout the width of the wedges formed by said jaws when the pivoted members are closed together thereby forming a double extending wedge; the jaws being provided upon their inner faces intermediate the bills and the pivotal connecting point with inwardly extending offsets combining with the bills to form an oblong recess.

In testimony whereof, I affix my signature in presence of two witnesses.

JOHN N. MACDONALD.

Witnesses:
ARTHUR T. SMITH,
WM. BARLOW.